United States Patent [19]

Bannai

[11] Patent Number: 4,925,122

[45] Date of Patent: May 15, 1990

[54] CABLE REEL

[75] Inventor: Hiroyuki Bannai, Miyagi, Japan

[73] Assignee: Alps Electric Co., Ltd., Tokyo, Japan

[21] Appl. No.: 311,926

[22] Filed: Feb. 16, 1989

[30] Foreign Application Priority Data

Apr. 24, 1988 [JP] Japan ............................ 63-52101[U]

[51] Int. Cl.⁵ ...................... B65H 75/02; H01R 39/00
[52] U.S. Cl. ................... 242/85; 242/54 R; 439/15
[58] Field of Search ................ 242/85, 84.8, 107.4 R, 242/54 R; 439/15, 27, 163, 164

[56] References Cited

U.S. PATENT DOCUMENTS 4,607,898  8/1986  Reighard et al. .................... 339/35
4,744,763  5/1988  Suzuki et al. ......................... 429/15

*Primary Examiner*—John Petrakes
*Assistant Examiner*—Steven M. duBois
*Attorney, Agent, or Firm*—Guy W. Shoup; Paul J. Winters

[57] ABSTRACT

In a cable reel including a fixed member having an outer ring wall, a movable member having an inner ring wall and rotatably mounted to the fixed member in such a manner that a space is defined between the outer ring wall and the inner ring wall, a flexible cable received in the space under a wound condition with a plurality of turns and having opposite ends fixed to the fixed member and the movable member and extending outside, so as to effect electrical connection between the fixed member and the movable member; the improvement comprises a presser member provided in the space for elastically pressing the flexible cable with the plurality of turns from inner and outer circumferential surfaces thereof.

2 Claims, 3 Drawing Sheets

CABLE REEL

BACKGROUND OF THE INVENTION

The present invention relates to a cable reel having a flexible cable such as a flat cable utilized for electrical connection between a fixed member and a movable member, and more particularly to a cable reel suitable for use with a steering device for an automobile.

A cable reel includes a flat cable constructed under a wound condition with a plurality of turns. The flat cable is fixed at its one end to a fixed member, and is also fixed at the other end to a movable member. The flat cable extends from both ends to the outside of the cable reel. When the movable member is rotated, the flat cable is wound up around the movable member, or it is unwound from the movable member. Thus, the movable member is allowed to be rotated by a predetermined amount. For example, the cable reel is used in a steering device for an automobile.

The flat cable as mentioned above is required to follow the rotation of the movable member to change its diameter of winding. Therefore, if the flat cable were formed of a material having a low flexural rigidity, a torque of the movable member upon unwinding would not be reliably transmitted from the inner circumferential side of the flat cable to the outer circumferential side thereof, and the flat cable would be bent back at the wound portion. to cope with this, the flat cable is usually formed by laminating a plurality of conductors between a pair of flexible films having a relatively large flexural rigidity. However, when the flat cable is in a mid position of winding up and unwinding, it is permitted to move radially. Under the condition, when external vibration is applied to the cable reel, the cable reel collides with each other or it collides with the outer ring wall of the fixed member or the inner ring wall of the movable member, causing the generation of undue noise. Particularly in the case that the cable reel is used in the automobile, for example, wherein vibration tends to be applied, the above problem remarkably occurs.

SUMMARY OF THE INVENTION

Accordingly, it is an object of the present invention to provide a cable reel which may reduce the noise due to the collision of the flat cable with each other or with the inner ring wall of the movable member or the outer ring wall of the fixed member.

According to the present invention, there is provided in a cable reel including a fixed member having an outer ring wall, a movable member having an inner ring wall and rotatably mounted to said fixed member in such a manner that a space is defined between said outer ring wall and said inner ring wall, a flexible cable received in said space under a wound condition with a plurality of turns, said flexible cable having opposite ends fixed to said fixed member and said movable member and extending outside, so as to effect electrical connection between said fixed member and said movable member; the improvement comprising a presser member provided in said space for elastically pressing said flexible cable with the plurality of turns from inner and outer circumferential surfaces thereof.

With the arrangement, when the flat cable is in a mid position of winding up and unwinding, it is elastically pressed by the presser member from the inner circumferential surface and the outer circumferential surface of the flat cable, thereby restraining the radial movement of the flat cable and reducing the noise due to the collision of the flat cable with each other or with the outer ring wall of the fixed member or the inner ring wall of the movable member. Further, when the movable member is rotated, the flat cable is wound up toward the movable member or unwound therefrom against an elastic force of the presser member elastically pressing the inner circumferential surface and the outer circumferential surface of the flat cable. Accordingly, under any conditions, the rotation of the movable member is not hindered by the pressure member.

Other objects and features of the invention will be more fully understood from the following detailed description and appended claims when taken with the accompanying drawings.

DETAILED DESCRIPTION OF THE PREFERRED EMBODIMENTS

Figure 1:
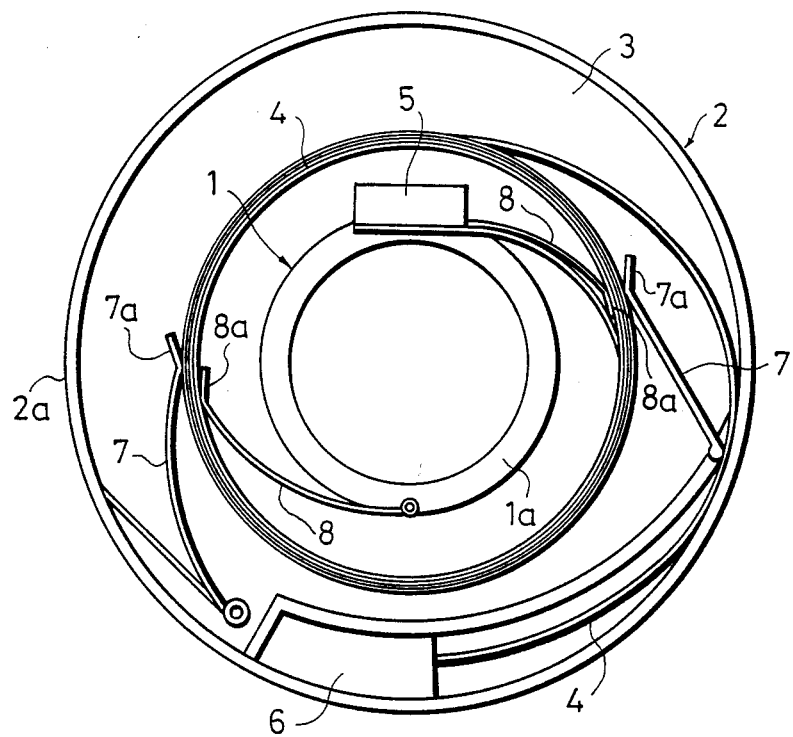
FIG. 1 is a plan view of the cable reel according to a first preferred embodiment of the present invention.

Referring now to FIG. 1 which shows the first preferred embodiment of the present invention, the cable reel is generally constructed of a movable member 1 having a central cylindrical inner ring wall 1a and a fixed member 2 rotatably supporting the movable member 1. Under the assembled condition of the movable member 1 and the fixed member 2, a given space 3 is defined between the inner ring wall 1a of the movable member 1 and an outer ring wall 2a formed at the outer circumferential edge of the fixed member 2.

A known flat cable 4 formed by laminating-a plurality of conductors between two flexible films having a relatively large flexural rigidity is housed in the space 3 under a wound condition with a plurality of turns. The flat cable 4 is connected at its inner end to a connector 5 mounted on the inner ring wall 1a, and is led out of the movable member 1. The outer end of the flat cable 4 is connected to a connector 6 mounted on the outer ring wall 2a, and is led out of the fixed member 2.

A pair of first elastic tongues 7 are fixedly provided in the vicinity of the outer ring wall 2a of the fixed member 2 at given circumferential intervals, each elastic tongue 7 being supported at one end in a cantilever manner. Each elastic tongue 7 has a presser portion 7a at a free end thereof to elastically press the outer circumferential surface of the flat cable 4 toward the center of the inner ring wall 1a. The presser portions 7a of the first elastic tongues 7 are located at opposite positions of about 180 degrees apart with respect to the inner ring wall 1a.

Similarly, a pair of second elastic tongues 8 are fixed to the inner ring wall 1a of the movable member 1 in a cantilever manner. Each elastic tongue 8 has a presser portion 8a at a free end thereof to elastically press the inner circumferential surface of the flat cable 4 toward the outer ring wall 2a. The presser portions 8a of the second elastic tongues 8 are located at opposite positions of about 180 degrees apart with respect to the inner ring wall 1a.

The first and second elastic tongues 7 and 8 are formed of highly elastic materials such as synthetic resin moldings or synthetic resin films. The positional relationship between the first and second elastic tongues 7 and 8 is such that the presser portions 7a and 8a elastically press on the inner and outer circumferential surfaces of the flat cable 4 at one position, and the other presser portions 7a and 8a also elastically press on the inner and outer circumferential surfaces of the flat cable 4 at another position opposite to the one position.

The cable reel thus constructed is actually used in such a manner that the movable member 1 is mounted on a steering wheel side of a steering device for an automobile, for example, and the fixed member 2 is mounted on a fixed shaft side of a vehicle body. FIG. 1 shows a condition where the flat cable 4 is in a mid position of winding up and unwinding. Under the condition, the wound portion of the flat cable 4 is radially inwardly pressed by the first two elastic tongues 7, and is simultaneously radially outwardly pressed by the second two elastic tongues 8. Thus, the wound portion of the flat cable 4 is elastically retained by the first and second elastic tongues 7 and 8. Accordingly, even when external vibration is applied to the cable reel, there is almost no possibility under usual using conditions that the coils of the flat cable 4 will collide with each other or will collide the inner ring wall 1a or the outer ring will 2a because radial movement of the flat cable 4 is retrained by the elastic tongues 7 and 8. As a result, the generation of noise due to such collision can be greatly reduced.

When the steering wheel (the movable member 1) is rotated in one direction from the position shown in FIG. 1, the flat cable 4 is wound up toward the inner ring wall 1a against the elastic force of the second elastic tongues 8, while the first elastic tongues 7 follow the radially inward movement of the flat cable 4 owing to the elastic force of itself. Reversely, when the steering wheel (the movable member 1) is rotated in the other direction, the flat cable 4 is unwound toward the outer ring wall 2a against the elastic force of the first elastic tongues 7, while the second tongues 8 follow the radially outwardly movement of the flat cable 4 owing to the elastic force of itself. Thus, the electrical connection between the movable member 1 and the fixed member 2 is maintained by the flat cable 4 under any conditions. When the movable member 1 is rotated in either direction, the relative position between the presser portions 7a of the first elastic tongues 7 and the presser portions 8a of the second elastic tongues 8 is gradually changed. However, according to the preferred embodiment, the two presser portions 7a of the first elastic tongues 7 are always opposed to each other at about 180 degrees apart, and the two presser portions 8a of the second elastic tongues 8 are always opposed to each other at about 180 degrees apart irrespective of the rotation of the movable member 1. With this arrangement, the flat cable 4 may be reliably elastically retained by the presser portions 7a and 8a irrespective of the rotational position of the movable member 1.

The mounting position and the number of the first and second elastic tongues 7 and 8 may be suitably modified. For example, three elastic tongues 7 may be provided at equal circumferential intervals of about 120 degrees apart, or more elastic tongues 7 may be provided similarly in consideration of a sufficient mounting space.

Figure 2:
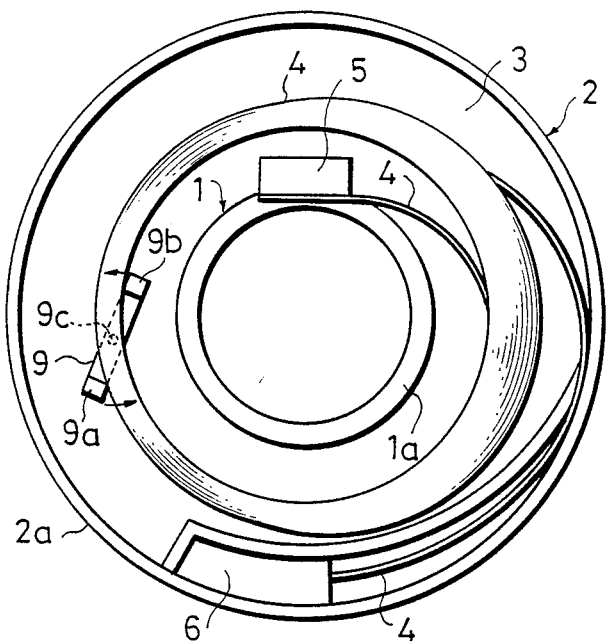
FIG. 2 is a plan view of the cable reel according to a second preferred embodiment of the present invention.
Figure 3:
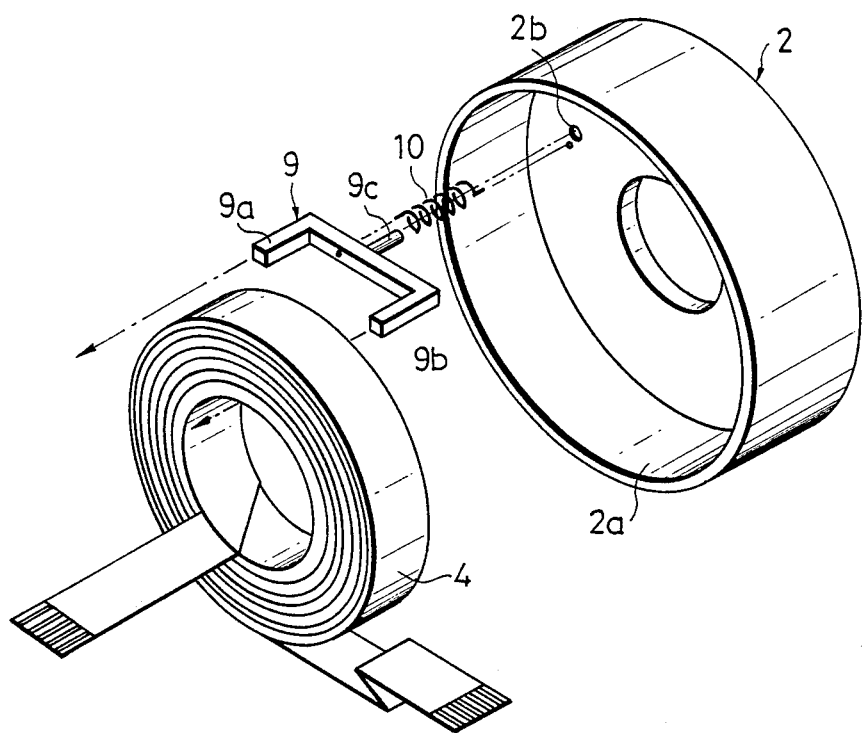
FIG. 3 is a perspective view of the essential part shown in FIG. 2.

Referring next to FIGS. 2 and 3 which show the second preferred embodiment of the present invention wherein the corresponding parts as in FIG. 1 are designated by the same reference numerals, a rotary member 9 and a coil spring 10 are substituted for the first and second elastic tongues 7 and 8 in the first preferred embodiment. The other constructions are basically similar to those in the first preferred embodiment.

As shown in FIG. 3, the rotary member 9 is formed with first and second arms 9a and 9b extending in the same direction in opposed and spaced relationship to each other and a pivotal shaft 9c projecting at a central position between the first and second arms 9a and 9b in a direction opposite to the extension of the first and second arms 9a and 9b. The pivotal shaft 9c is inserted into a hole 2b formed through the fixed member 2 with the coil spring 10 mounted around the pivotal shaft 9c. Thus, the rotary member 9 is rotatably supported to a given position of the fixed member 2, and an elastic force of the coil spring 10 in a direction as depicted by arrows shown in FIG. 2, for example, is applied to the rotary member 9. A plurality of turns of the flat cable 4 are sandwiched between the first and second arms 9a and 9b of the rotary member 9 in such a manner that the outer circumferential surface of the flat cable 4 is radially inwardly pressed by the first arm 9a and the inner circumferential surface of the flat cable 4 is radially outwardly pressed by the second arm 9b.

Accordingly, when the flat cable 4 is in the mid position of winding up and unwinding as shown in FIG. 2, the flat cable 4 is elastically pressed from radially opposite directions by the first and second arms 9a and 9b, and is gathered at the rotary member 9, so that the radial movement of the flat cable 4 is restrained. On the other hand, when the flat cable 4 is wound up or unwound from the position shown in FIG. 2, the rotary member 9 follows the radial movement of the flat cable 4 and is rotated in a direction counter to the arrows shown in FIG. 2, so that the movement of the flat cable may not be hindered. Also in the second preferred embodiment, a plurality of the rotary members 9 may be provided as required.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a cable reel including a fixed member having an outer ring wall, a movable member having an inner ring wall and rotatably mounted to said fixed member in such a manner that a space is defined between said outer ring wall and said inner ring wall, a flexible cable received in said space under a wound condition with a plurality of turns, said flexible cable having opposite ends fixed to said fixed member and said movable member and extending outside, so as to effect electrical connection between said fixed member and said movable member; the improvement comprising a pressure member having a first elastic tongue provided on said fixed member for biasing said flexible cable toward said inner ring wall and a second elastic tongue provided on said movable member for biasing said flexible cable toward said outer ring wall, said first and second elastic tongues being formed of elastic material.

2. In a cable including a fixed member having an outer ring wall, a movable member having an inner ring wall and rotatably mounted to said fixed member in such a manner that a spaced is defined between said outer ring wall and said inner ring wall, a flexible cable received in said space under a wound condition with a plurality of turns, said flexible cable having opposite ends fixed to said fixed member and said movable member and extending outside, so as to effect electrical connection between said fixed member and said movable member; the improvement comprising a pressure member having a rotary member pivotably supported to said fixed member and having two arms and an elastic member for elastic rotating said rotary member in one direction, wherein said flexible cable with the plurality of turns in held between two said arms.

* * * * *

UNITED STATES PATENT AND TRADEMARK OFFICE
CERTIFICATE OF CORRECTION

PATENT NO. : 4,925,122

DATED : May 15, 1990

INVENTOR(S) : Hiroyuki Bannai

It is certified that error appears in the above-identified patent and that said Letters Patent is hereby corrected as shown below:

ON TITLE PAGE:

Foreign Application Priority Data:

"Apr. 24, 1988" should read --Apr. 20, 1988--

Col. 4, Line 62, Claim 1

"pressure" should read --presser--

Col. 5, Line 4, Claim 2

"spaced" should read --space--

Col. 6, Line 2, Claim 2

"pressure" should read --presser--

Signed and Sealed this

Twenty-second Day of October, 1991

*Attest:*

HARRY F. MANBECK, JR.

*Attesting Officer*    *Commissioner of Patents and Trademarks*